United States Patent
Phillips

(10) Patent No.: US 9,358,933 B2
(45) Date of Patent: Jun. 7, 2016

(54) TRUNK MOUNTED BIKE CARRIER

(75) Inventor: Sean Phillips, Huntsville (CA)

(73) Assignee: Cequent Performance Products, Inc., Plymouth, MI (US)

( * ) Notice: Subject to any disclaimer, the term of this patent is extended or adjusted under 35 U.S.C. 154(b) by 232 days.

(21) Appl. No.: 13/509,831

(22) PCT Filed: Nov. 19, 2010

(86) PCT No.: PCT/US2010/057464
§ 371 (c)(1),
(2), (4) Date: Nov. 28, 2012

(87) PCT Pub. No.: WO2011/063254
PCT Pub. Date: May 26, 2011

(65) Prior Publication Data
US 2013/0062384 A1    Mar. 14, 2013

Related U.S. Application Data

(60) Provisional application No. 61/262,697, filed on Nov. 19, 2009.

(51) Int. Cl.
*B60R 9/00* (2006.01)
*B60R 9/10* (2006.01)
*B60R 9/06* (2006.01)

(52) U.S. Cl.
CPC .... *B60R 9/10* (2013.01); *B60R 9/06* (2013.01)

(58) Field of Classification Search
CPC ............ B60R 9/00; B60R 9/06; B60R 9/065; B60R 9/08; B60R 9/10
USPC .................. 224/497, 488, 495, 499–505, 511
See application file for complete search history.

(56) References Cited

U.S. PATENT DOCUMENTS

| | | | |
|---|---|---|---|
| 3,710,999 A * | 1/1973 | Allen | 224/500 |
| 3,752,375 A | 8/1973 | Weigl | |
| 4,394,948 A | 7/1983 | Graber | |
| 4,452,385 A * | 6/1984 | Prosen | 224/493 |
| 4,676,413 A | 6/1987 | Began et al. | |
| 4,863,080 A | 9/1989 | Graber | |
| 5,056,700 A * | 10/1991 | Blackburn et al. | 224/324 |
| 5,065,921 A | 11/1991 | Mobley | |
| 5,118,020 A * | 6/1992 | Piretti | 224/493 |

(Continued)

FOREIGN PATENT DOCUMENTS

| | | |
|---|---|---|
| GB | 197107 | 5/1923 |
| WO | WO2011/063254 | 5/2011 |

OTHER PUBLICATIONS

International Search Report and the Written Opinion, Cequent Performance Products, Inc., Jan. 27, 2011.

(Continued)

*Primary Examiner* — Brian D Nash
(74) *Attorney, Agent, or Firm* — McDonald Hopkins LLC

(57) ABSTRACT

A bike carrier capable of attaching to the rear of a vehicle is described. The bike carrier includes a first adjustable member that is adjustable to a plurality of positions and a second member that is pivotally secured to the first member. The second member is also adjustable to a plurality of positions independent of the fixed positions of said first member. The bike carrier includes at least one mount rail secured to the first and second members. The mount rail is capable of carrying a bicycle.

26 Claims, 8 Drawing Sheets

(56) References Cited

U.S. PATENT DOCUMENTS

| | | | |
|---|---|---|---|
| 5,135,145 A * | 8/1992 | Hannes et al. | 224/493 |
| 5,195,670 A * | 3/1993 | Piretti et al. | 224/321 |
| 5,211,323 A * | 5/1993 | Chimenti et al. | 224/314 |
| 5,363,996 A * | 11/1994 | Raaber et al. | 224/314 |
| 5,495,970 A | 3/1996 | Pedrini | |
| 5,645,202 A * | 7/1997 | Kaloustian | 224/314 |
| 5,775,560 A | 7/1998 | Zahn et al. | |
| 5,938,093 A | 8/1999 | Bloemer et al. | |
| D447,997 S * | 9/2001 | Ferman et al. | D12/408 |
| 6,286,738 B1 * | 9/2001 | Robins et al. | 224/314 |
| 6,386,407 B1 * | 5/2002 | Erickson et al. | 224/282 |
| 6,422,443 B1 * | 7/2002 | Erickson et al. | 224/532 |
| 6,644,525 B1 * | 11/2003 | Allen et al. | 224/497 |
| 6,772,927 B2 * | 8/2004 | Bogoslofski | 224/324 |
| 7,404,504 B2 * | 7/2008 | Settelmayer | 224/497 |
| 7,810,685 B2 * | 10/2010 | Bove et al. | 224/324 |
| 7,866,517 B2 * | 1/2011 | Pedrini | 224/532 |
| D637,137 S * | 5/2011 | Weaver et al. | D12/408 |
| 7,975,888 B2 * | 7/2011 | Settelmayer | 224/497 |
| 8,025,196 B2 * | 9/2011 | Flaherty et al. | 224/533 |
| 8,028,878 B1 * | 10/2011 | Pedrini | 224/495 |
| 8,109,422 B2 * | 2/2012 | Murray | 224/314 |
| D656,080 S * | 3/2012 | Budd et al. | D12/408 |
| D671,883 S * | 12/2012 | Farber | D12/408 |
| 8,573,456 B2 * | 11/2013 | Farber | 224/504 |
| D706,209 S * | 6/2014 | Flaherty et al. | D12/407 |
| 2002/0096546 A1 * | 7/2002 | Bogoslofski | 224/497 |
| 2002/0117524 A1 * | 8/2002 | Jeong | 224/314 |
| 2006/0032879 A1 * | 2/2006 | Settelmayer | 224/497 |
| 2006/0032880 A1 * | 2/2006 | Settelmayer | 224/497 |
| 2006/0060623 A1 * | 3/2006 | Huang | 224/504 |
| 2007/0034657 A1 * | 2/2007 | Murray | 224/497 |
| 2010/0127031 A1 * | 5/2010 | Sautter et al. | 224/500 |
| 2011/0068138 A1 * | 3/2011 | Flaherty et al. | 224/324 |
| 2012/0000952 A1 * | 1/2012 | Dreger et al. | 224/533 |
| 2012/0234883 A1 * | 9/2012 | Sautter et al. | 224/502 |

OTHER PUBLICATIONS

International Preliminary Report on Patentability, Cequent Performance Products, Inc., May 31, 2012.

* cited by examiner

TRUNK MOUNTED BIKE CARRIER

CROSS-REFERENCE TO RELATED APPLICATION

This application claims benefit from U.S. Provisional Patent Application No. 61/262,697, entitled "Trunk Mounted Bike Carrier," filed on Nov. 19, 2009, which is hereby incorporated in its entirety by reference.

FIELD OF INVENTION

The present invention generally relates to a vehicle accessory mount and, more particularly, to a trunk mounted bicycle carrier.

BACKGROUND

It is known to utilize vehicle mounted bicycle carriers for transporting bicycles or other items. It is essential to the safety of the bicycle or other item being transported that the carrier be secured to the vehicle properly. Therefore, it is important that these vehicle mounted carriers be positionable at an appropriate location on the vehicle. They are often placed either on the roof or on the rear portion of a vehicle, such as a trunk. However, bicycles transported on the roof may significantly add to the air drag of the vehicle and may therefore reduce gas mileage. In addition, roof mounted racks may be inconvenient since the bicycle rack connections may be located high up on the vehicle, whereby they are difficult to reach.

Typically, the rear mounted types of bicycle carriers may require engagement with a vehicle bumper. To engage the bumper, the bicycle carriers may require clamps or brackets that may engage with the upper and lower edges of the vehicle bumper in order to retain the carrier on the bumper. However, the rear bumpers on many automobiles may be shaped or sized or covered in material that prevents the attachment and use of hooks over the edges of the bumper. In addition, bumper mounted carriers, if not properly designed or installed, may scratch the bumper surface. Other types of rear mounted carriers may require the use of complicated assemblies that are difficult to adjust.

Therefore, there is a need in the art for an improved trunk mounted bicycle carrier or bike mount that may be quickly and easily installed and adjusted onto the rear portion of a vehicle.

SUMMARY OF THE INVENTION

A mount assembly securable to a vehicle is generally described. The mount assembly includes a first member that is adjustable in a plurality of fixed positions and a second member that is pivotally secured to the first member and also adjustable in a plurality of fixed positions independent of the fixed positions of said first member. The mount assembly further includes at least one mount rail secured to the first and second members. The mount rail is designed to be capable of carrying a bicycle.

DESCRIPTION OF THE DRAWINGS

Objects and advantages together with the operation of the invention may be better understood by reference to the following detailed description taken in connection with the following illustrations, wherein.

DETAILED DESCRIPTION

Figure 1:
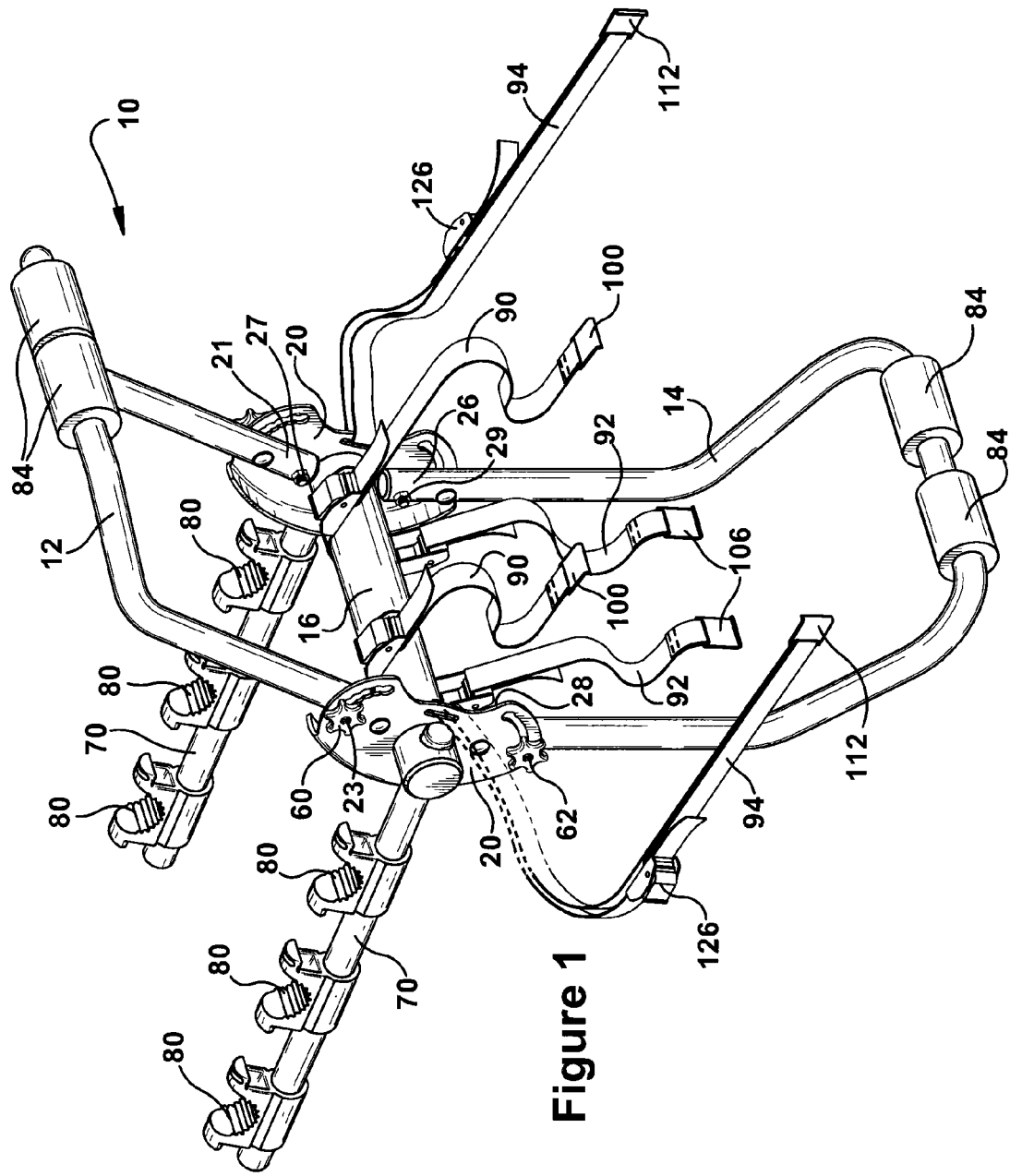
FIG. 1 illustrates a perspective view of a bike mount in an open position without straps.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

A trunk mounted carrier or bike mount 10 is illustrated in FIGS. 1-8. The bike mount 10 may be utilized to temporarily store and transport a variety of personal accessories, such as a bicycle, on the trunk, hatch, or otherwise on the rear end of a vehicle 11. The bike mount 10 may include an upper attachment bar 12, a lower attachment bar 14, a central bar 16, and at least one bracket 20. The central bar 16 may be of any appropriate shape or size, such as a generally cylindrical, square or tubular shape.

The bike mount 10 may include any appropriate number of brackets 20, such as two brackets 20 as shown. The brackets 20 may be located at any appropriate position, whereby one bracket 20 may be located on either side of the central bar 16; see FIGS. 1 and 2. The central bar 16 may be located through the approximate centers of the side brackets 20. Although, the central bar 16 may be located through different locations along the brackets 20. The brackets 20 may be attached to the central bar 16 by any appropriate means, such as by fasteners, welding, or the like.

Figure 2:
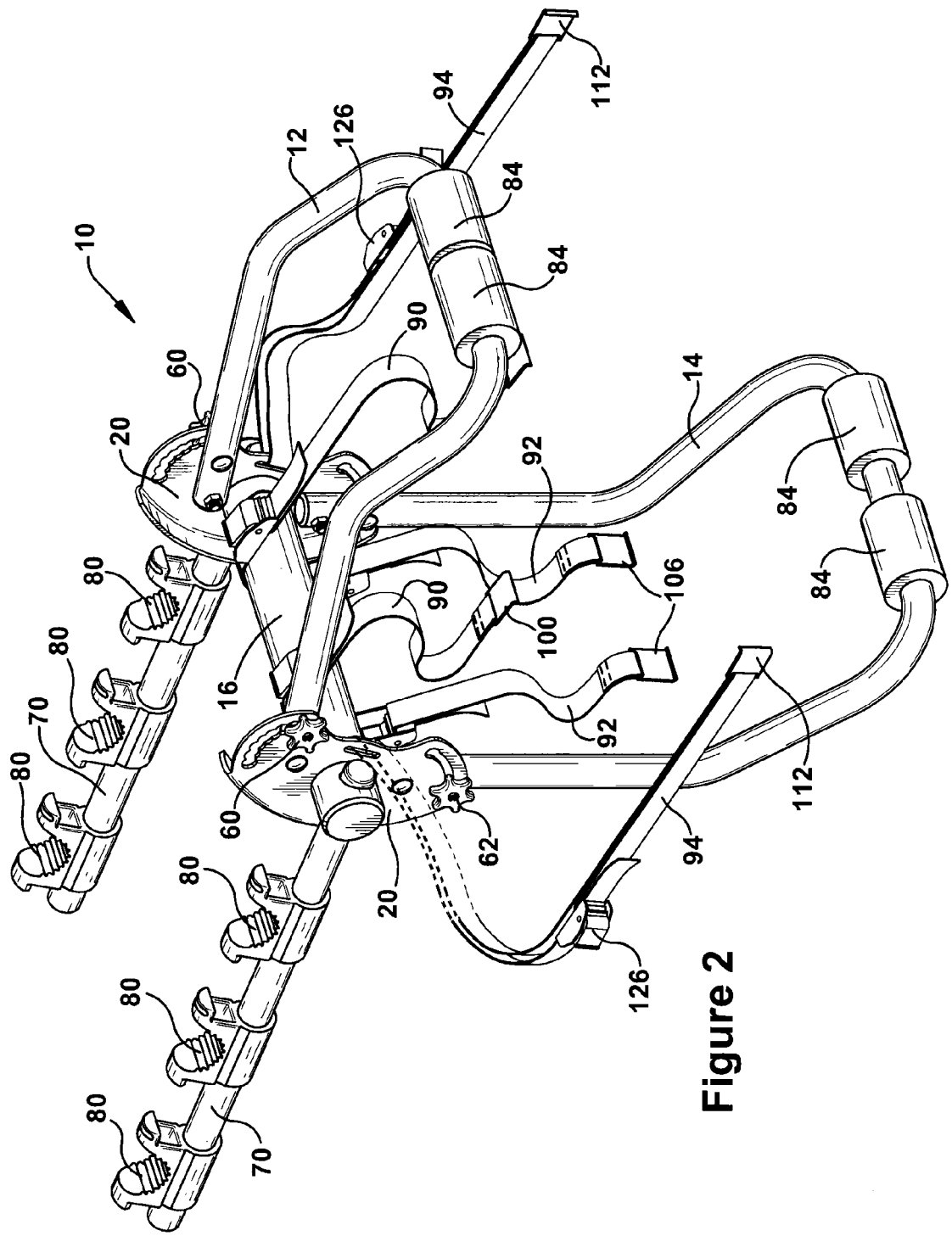
FIG. 2 illustrates a perspective view of the bike mount in a closed position without straps.

The upper attachment bar 12 may be of any appropriate shape or size, such as a generally curved, tubular, or U-shaped bar; see FIGS. 1 and 2. The upper bar 12 may be located at any appropriate position whereby each end 21, 23 of the U-shaped upper attachment bar 12 may be pivotally attached to the brackets 20, for example. The ends 21, 23 of the upper bar 12 may be pivotally attached to the brackets 20 near an upper end portion 25 of the brackets 20. The upper bar 12 may be pivotally attached to the brackets 20 by any appropriate means, such as by fasteners or the like. As shown in the present embodiment, each end 21, 23 of the upper bar 12 is attached to the brackets 20 using a nut and bolt 27 combination.

The lower attachment bar 14 may be of any appropriate shape or size, such as a generally curved, tubular, or U-shaped bar; see FIGS. 1 and 2. The lower attachment bar 14 may be located at any appropriate position, whereby each end 26, 28 of the U-shaped lower attachment bar 14 may be pivotally attached to the brackets 20, for example. The ends 26, 28 of the lower bar 14 may be pivotally attached to the brackets 20 near a lower end portion 31 of the brackets 20. The lower bar 14 may be pivotally attached to the brackets 20 by any appropriate means, such as by fasteners or the like. The upper and lower attachment bars 12, 14 may also be generally curved so that they may appear as a general claw or clam shell shape when viewed together; see FIGS. 1 and 2. As shown in the present embodiment, each end 26, 28 of the lower attachment bar 14 is attached to the brackets 20 using a nut and bolt 29 combination.

Figure 3:
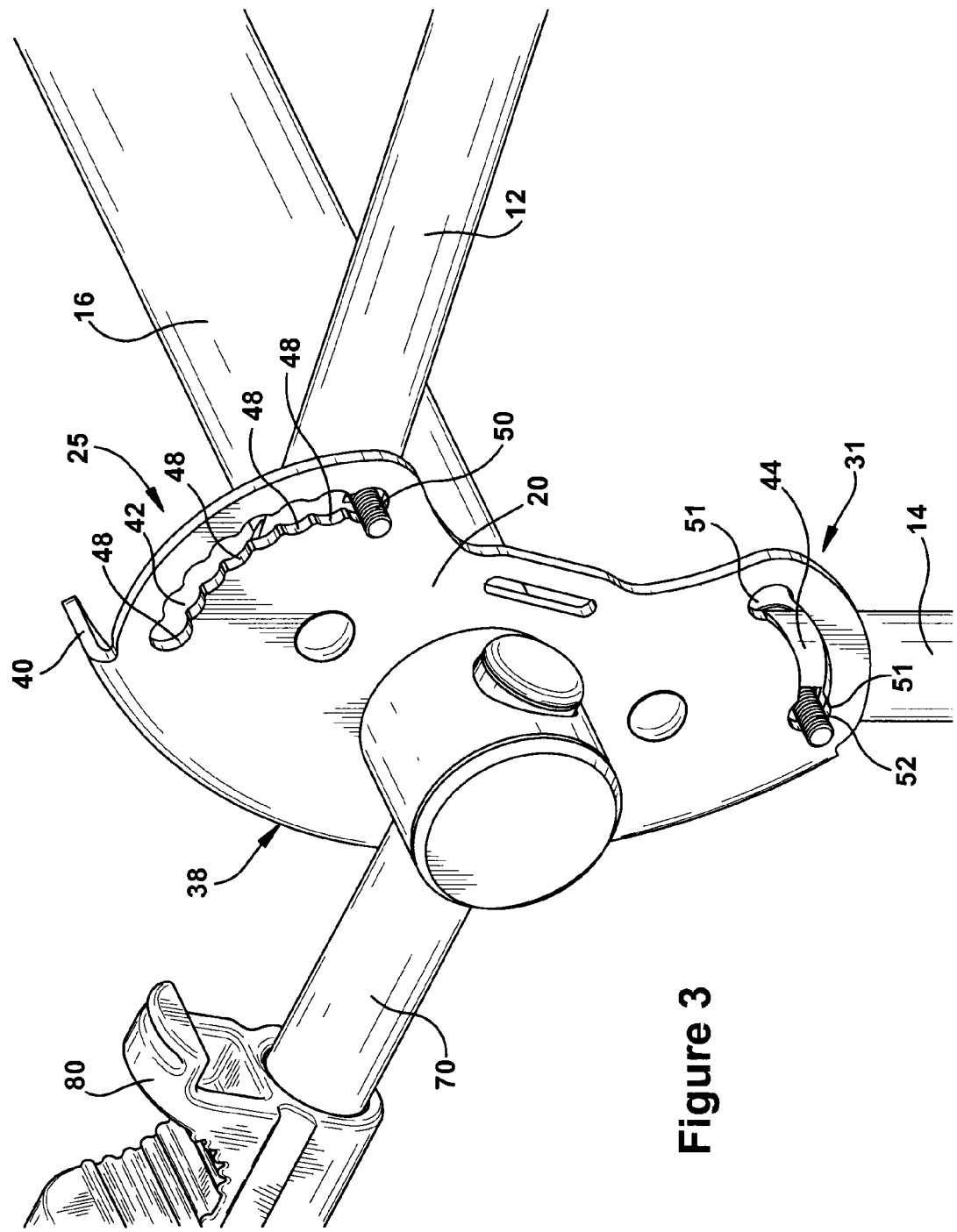
FIG. 3 illustrates a close up perspective view of the bike mount.
Figure 4:
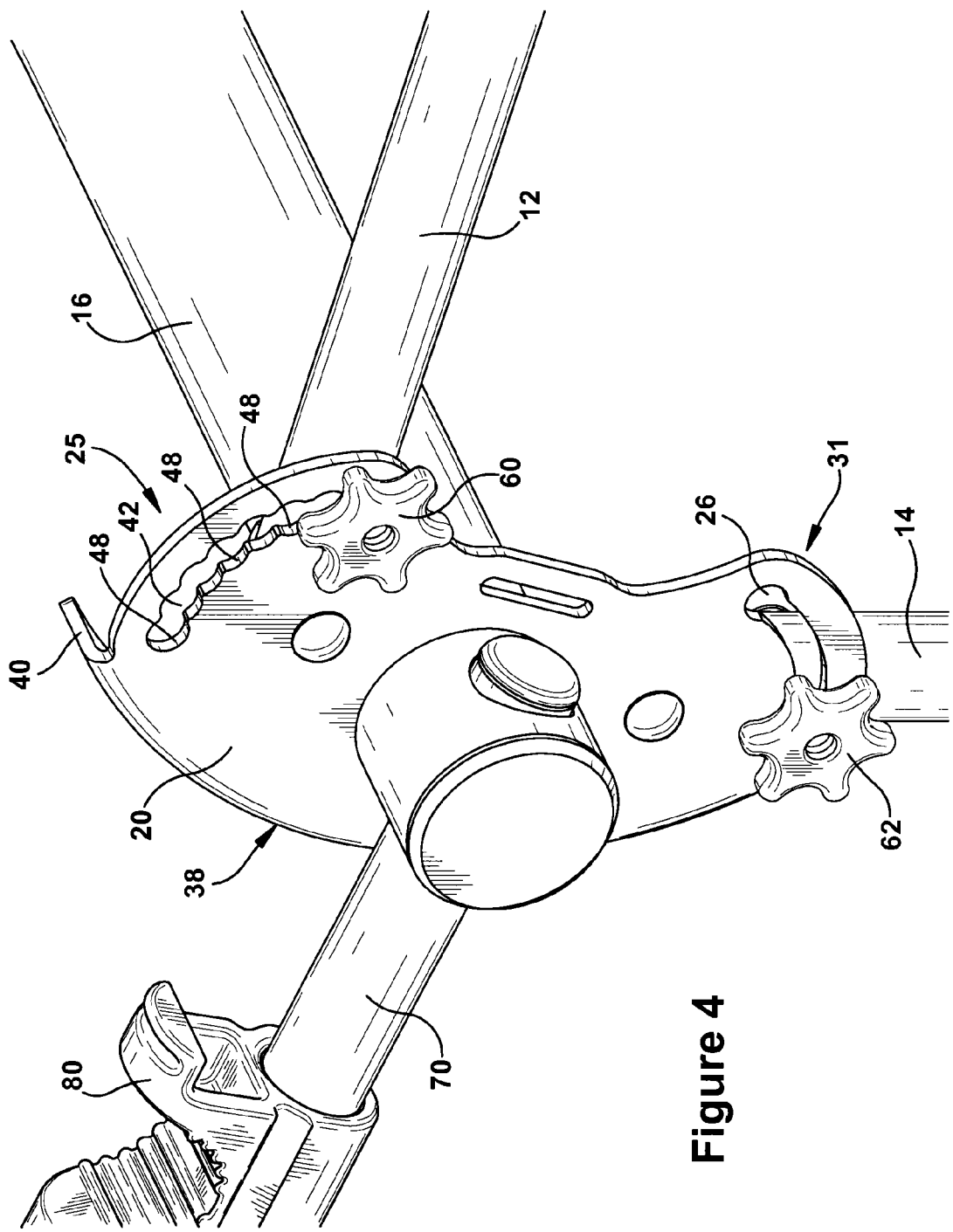
FIG. 4 illustrates a close up perspective view of the bike mount.
Figure 5:
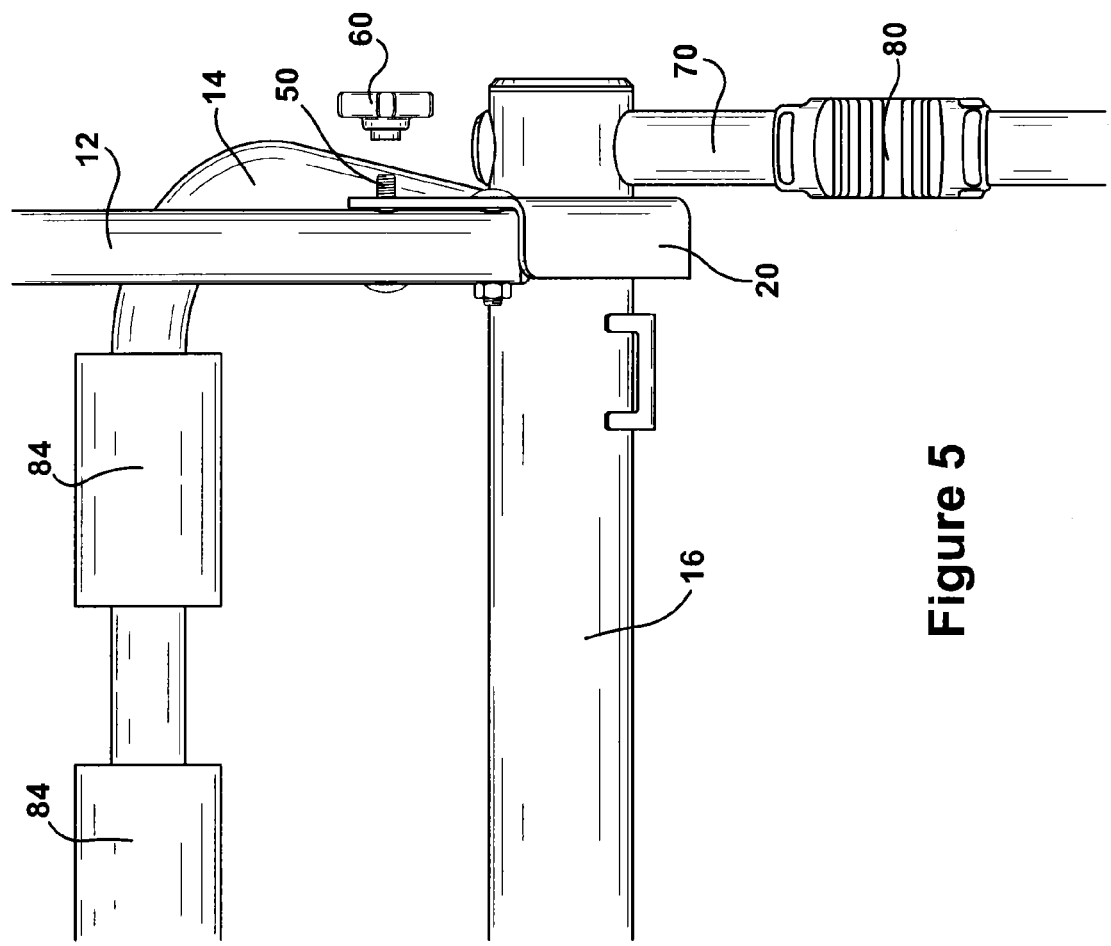
FIG. 5 illustrates a top view of the bike mount.

The brackets 20 may be of any appropriate shape or size, such as a generally circular, ovular, rectangular, or curved shape. The shape of the bracket 20 may permit the bracket 20 to fit over the variety of geometries of the vehicle, such as a spoiler. The brackets 20, as shown in FIGS. 3 and 4, may include the upper end 25, the lower end 31 and a generally curved side 38. The curved side 38 may include a flange 40.

The brackets 20 may be adjustable and permit the upper and lower bars 12, 14 to be selectively positionable on the rear of the vehicle 11. For example, the brackets 20 may include an adjustment slot 42 and a counter slot 44; see FIGS. 3 and 4. The adjustment slot 42 may be of any appropriate shape or size, such as a generally curved shape. The adjustment slot 42 may be of a similarly curved shape as that of the upper end 25 of the bracket 20. The adjustment slot 42 may be located at any appropriate position on the brackets 20, such as adjacent the upper end 25 nearer to the upper attachment bar 12. The adjustment slot 42 may also include a plurality of resting positions 48 located throughout the length of the adjustment slot 42. Each of these positions 48 may locate an adjustment rod 50 attached to the upper attachment bar 12 within that position 48, whereby the bike mount 10, and in particular, the upper attachment bar 12, may be adjustable to a variety of fixed positions to accommodate various vehicles. In the embodiment shown, the resting positions 48 consists of notches within the adjustment slot 42 that are capable of engaging the adjustment rod 50 to hold the upper attachment bar 12 in a desired fixed position.

The counter slot 44 may be of any appropriate shape or size, such as a generally curved shape. The counter slot 44 may be of a similarly curved shape as that of the lower end 31 of the bracket 20. The counter slot 44 may be located at any appropriate position on the brackets 20, such as adjacent the lower end 31 nearer to the lower attachment bar 14. The counter slot 44 includes a plurality of resting positions 51 located throughout the length of the counter slot 44. Each of these positions 51 may locate a counter rod 52 within that position 51, whereby the bike mount 10, and in particular, the lower attachment arm 14, may be adjustable to a variety of fixed positions to accommodate various vehicles. In the embodiment shown, the resting positions 51 consists of notches within the counter slot 44 that are capable of engaging the counter rod 52 to hold the lower attachment bar 14 in a desired fixed position.

Figure 6:
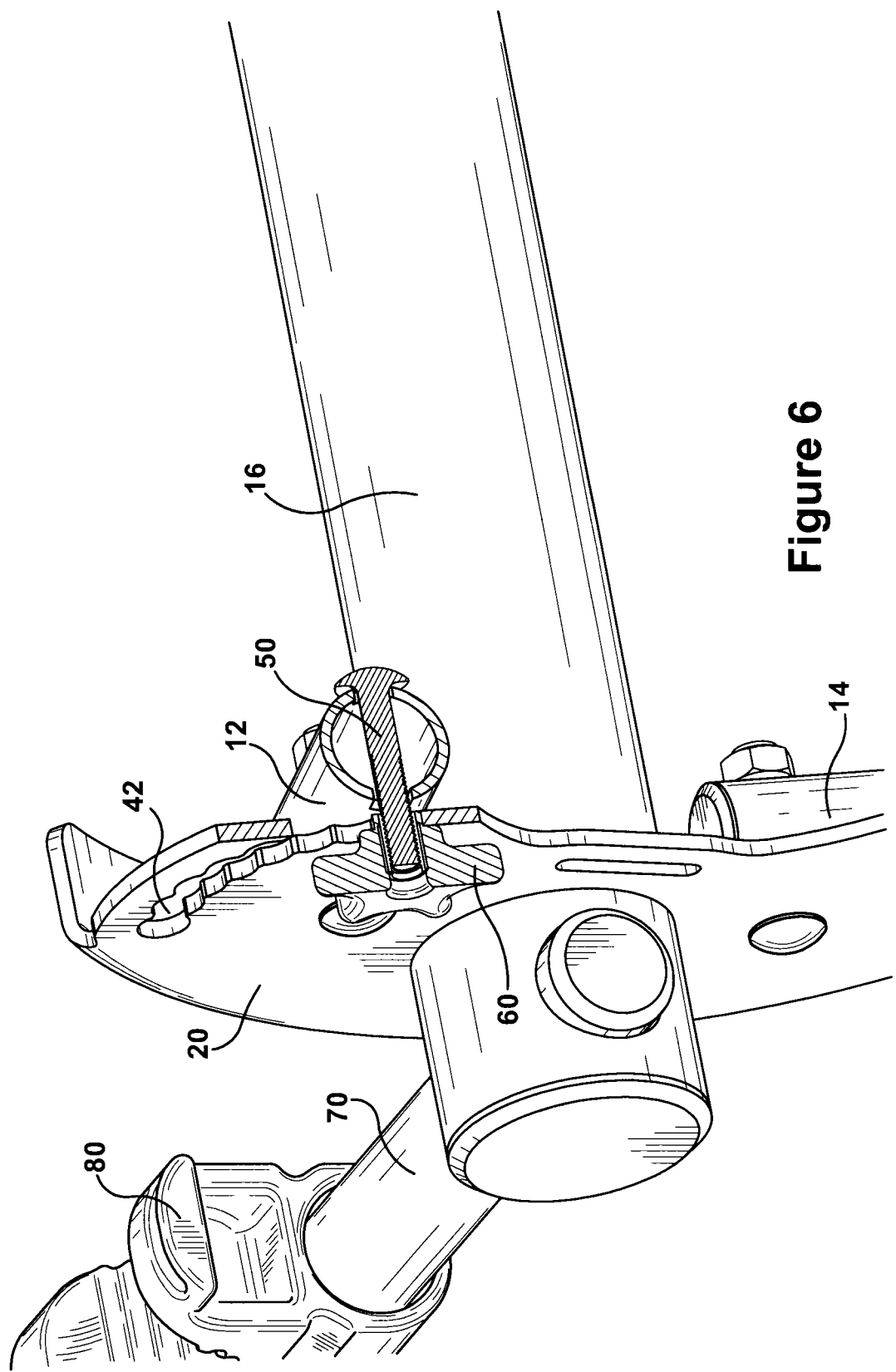
FIG. 6 illustrates a close up partial sectional view of the bike mount.

The upper and lower attachment bars 12, 14 may be pivotally coupled to the brackets 20 by fasteners 27, 29, such as a rod, nut and bolt combination, bolt or screw; see FIGS. 1, 3 and 6. The upper attachment bar 12 may further be secured to the brackets 20 with an adjustment rod 50 through the adjustment slot 42. The lower attachment bar 14 likewise may further be secured to the brackets 20 with a counter rod 52 through the counter slot 44. The upper and lower attachment bars 12, 14 thereby pivot relative to brackets 20 to accommodate attachment to vehicles of varying configuration. The engagement of the adjustment rod and counter rods 50, 52 with the corresponding notches 48, 51 secure the upper and lower bars 12, 14 in a fixed position. Further, the adjustment and counter rods 50, 52 may also comprise a bolt, screw or the like.

The bike mount 10 may include at least one rotating knob 60; see FIGS. 1 and 4-6. For example, there may be a rotating knob 60 located on either side of the bike mount 10. The rotating knobs 60 may secure to an end of the adjustment rod 50. The rotating knobs 60 may permit the adjustment rods 50 to be adjusted to fit into different notches 48 along the adjustment slot 42, whereby upper attachment bar 12 can be retained in a fixed relative position to allow bike mount 10 to accommodate a variety of different vehicle trunks or hatches.

The bike mount 10 may also include at least one counter slot knob 62 (FIGS. 1 and 4-6). For example, there may be a counter slot knob 62 located on either of the bike mount 10. The counter slot knobs 62 may be secured to an end of the counter rods 52. The counter slot knobs 62 may be adjusted to permit rotation or adjustment, whereby lower attachment bar 14 can be retained in a fixed relative position to allow bike mount 10 to accommodate a variety of different vehicle trunks or hatches. The upper and lower bars 12, 14 can move independently of each other so that each can be fixed in a different position to accommodate varying sized and shaped vehicles 11 to permit attachment of the bike mount 10 to such vehicle 11.

In operation, the user may use the adjustment knobs 60 to selectively secure the adjustment rods 50 to the desired resting positions 48 within the adjustment slots 42 in the brackets 20, thereby adjusting the upper attachment bar 12 to a desired fixed position. The counter slot knobs 62 may also be adjusted to selectively secure the counter slot rod 52 and thereby the lower attachment bar 14 to a desired fixed position. After the rods 50, 52 are in the desired positions in the brackets 20, the upper and lower attachment bars 12, 14 may be selectively positioned on the vehicle to transport the bike mount 10 and bicycles. The user can loosen the adjustment knobs 60 and the counter slot knobs 62 to pivot the upper attachment arm 12 and the lower attachment arm 14 to the appropriate fixed position. The user can move the upper attachment arm 12 such that the attachment rod 50 moves from its current notch 48 to a different notch 48 within the adjustment slot 42. Once the upper attachment arm 12 is in the appropriate fixed position, the user can tighten the adjustment knob 60 to hold the upper attachment arm 12 in the appropriate fixed position. Likewise, the user can move the lower attachment arm 14 such that the counter rod 52 moves from its current notch 51 to a different notch 51 within the counter slot 44. Once the lower attachment arm 14 is in the appropriate fixed position, the user can tighten the counter slot knob 62 to hold the lower attachment arm 14 in the appropriate fixed position The bike mount 10 may include at least one mount rail 70; see FIGS. 1 and 2. For example, the bike mount 10 may have any appropriate number of mount rails 70, such as two. The mount rails 70 may be of any appropriate shape or size, such as a generally circular, square or tubular shape. The mount rails 70 may be located at any appropriate position, such as being located on either end of the central bar 16. The mount rails 70 may be attached to the central bar 16 by any appropriate means, such as by fasteners, welding, or the like. The mount rails 70 can extend away from the upper and lower attachment arms 12, 14 so that the user can load the bicycle onto the mount rails 70.

Figure 8:
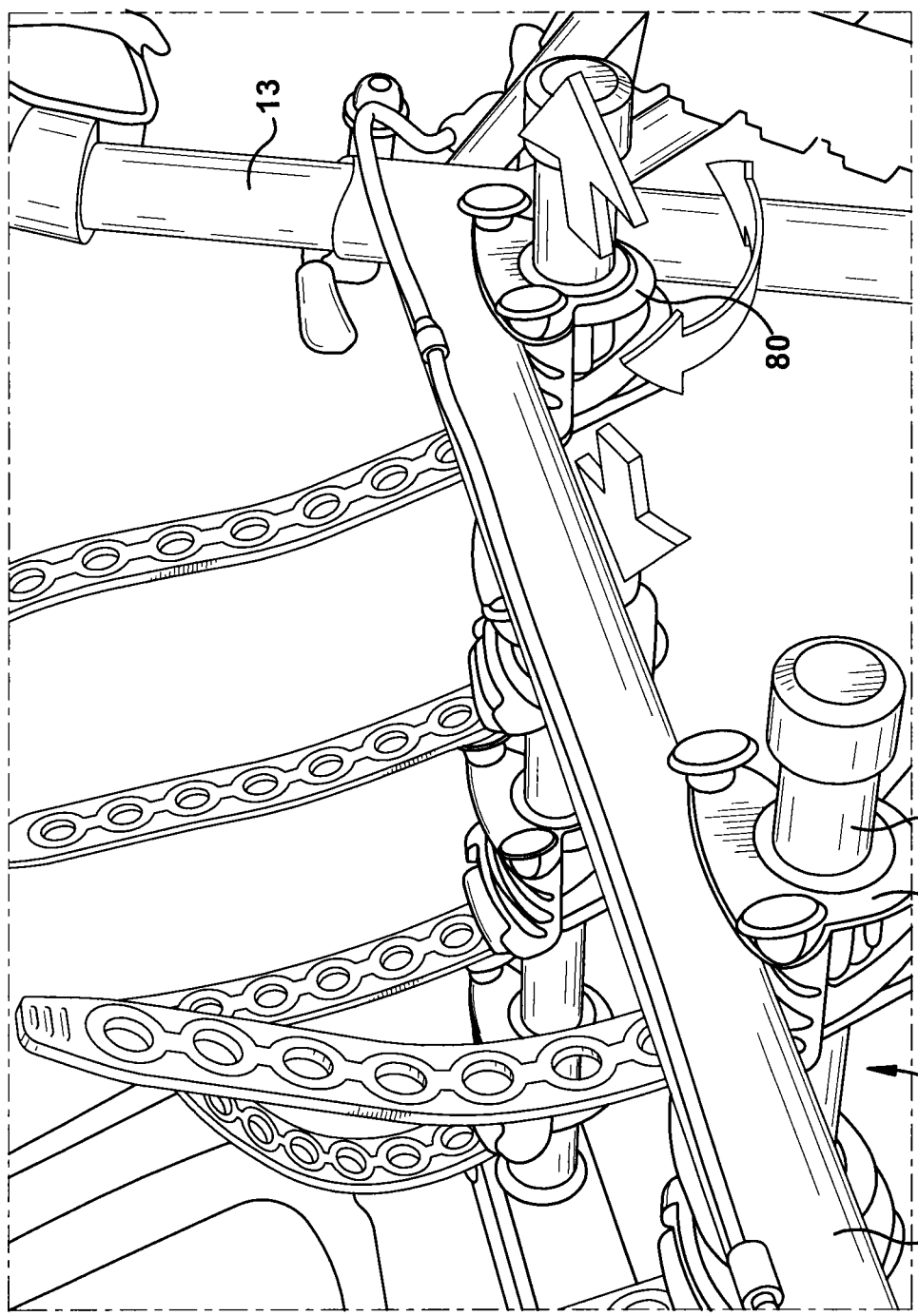
FIG. 8 illustrates a perspective view of a bicycle attached to the bike mount.

The mount rails 70 may include at least one mounting member 80; see FIGS. 1 and 2. There may be any appropriate number of mounting members 80, such as one, two three, etc. The mounting members 80 may be of any appropriate shape or size, such as of a general shape to receive a bicycle component, such as a frame of the bicycle. The mounting members 80 may be located at any appropriate position on the mount rails 70, such as equidistantly spaced along each rail 70. The mounting members 80 may be configured to hold a portion of an object to be mounted to the bike mount 10. For example, the mounting members may be capable of receiving a portion, such as a crossbar, of a bicycle 13, as illustrated in FIG. 8.

The bike mount 10 may also include at least one pad 84; see FIGS. 1 and 2. The pads 84 may be of any appropriate shape or size, such as a generally cylindrical shape. The pads 84 may be made out of any appropriate material, such as a generally soft material that may protect the surface of the vehicle from any scratches from the bike mount 10. While shown and described as having two pads 84 on both the upper attachment bar 12 and lower attachment bar 14, it is to be understood that there may be any appropriate number of pads 84 located on the upper attachment bar 12 or lower attachment bar 14 and should not be limited to that shown or described herein.

The pads 84 may be located at any appropriate position on the bike mount 10, such as on the attachment bars 12, 14. For example, there may be two pads 84 located on the upper attachment bar 12, such as at the approximate center of the upper bar 12 where the bar 12 may engage the vehicle trunk or hatch. There may be two pads 84 located on the lower attachment bar 14, such as at the approximate center of the lower bar 14 where the bar 14 may engage the vehicle 11, such as the bumper of the vehicle 11.

The bike mount 10 may further include a top strap 90, a lower strap 92, and a side strap 94. As shown in the current embodiment, there may be a pair of top straps 90, a pair of lower straps 92 and a pair of side straps 94. Although a pair is shown, a different number of top straps 90, lower straps 92, and side straps 94 may be used. The top straps 90 include a first end 95 and a second end 96. The top straps 90 may include a hooked end 100 located on the second end 96 thereof that is capable of attaching to the top edge of a trunk or hatch of the vehicle 11. The bottom straps 92 may include a first end 102 and a second end 104. The bottom straps may further include a hooked end 106 located at the second end 104 thereof. The hooked end 106 is capable of attaching to the bottom edge of a trunk or hatch of the vehicle 11. The side straps 94 include a first end 108 and a second end 110 wherein a hooked end 112 may be located at the second end 110 thereof. The hooked end 112 is capable of attaching to the side edge of a trunk or hatch of the vehicle 11.

Figure 7:
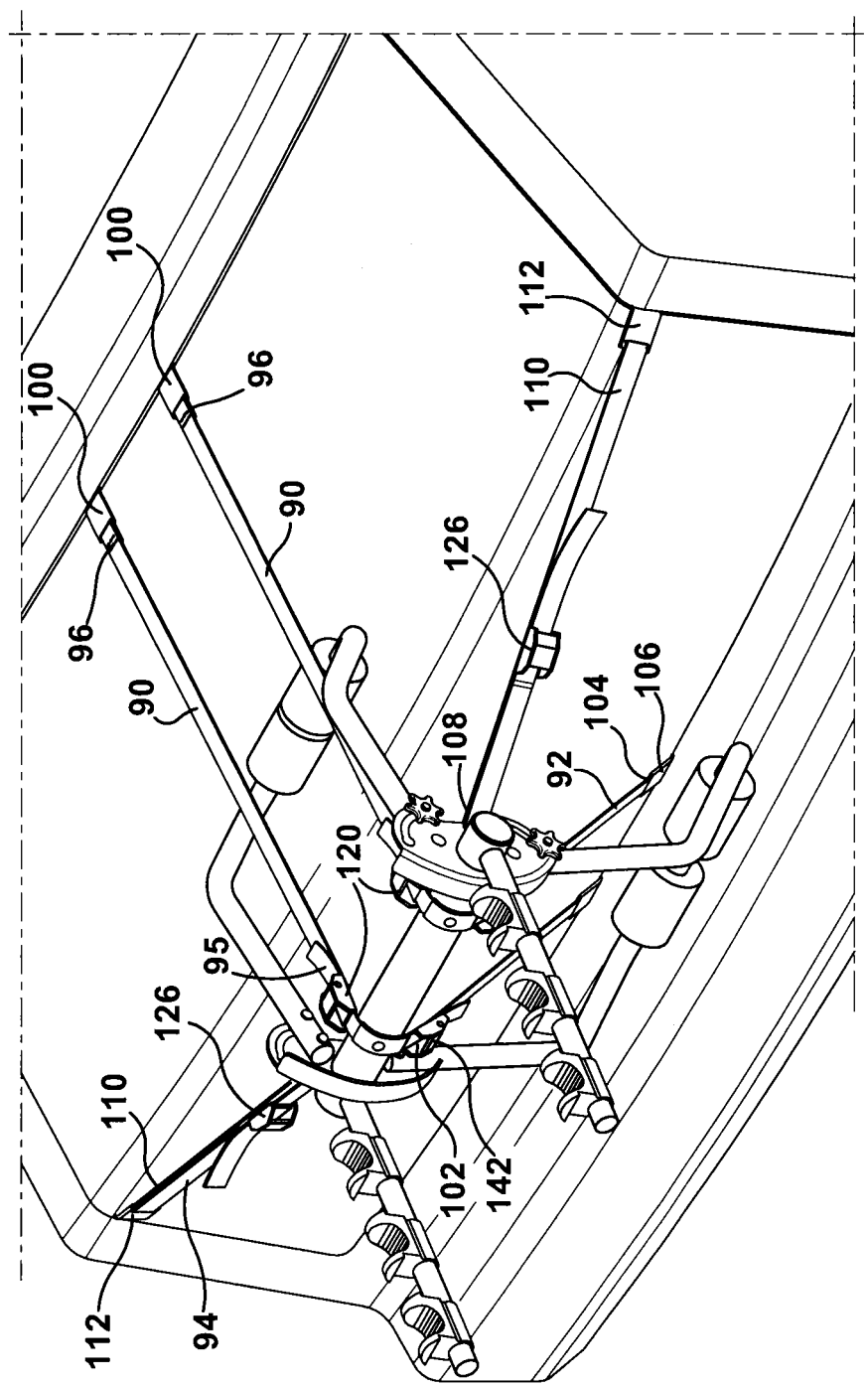
FIG. 7 illustrates a perspective view of the bike mount secured to a vehicle.

The first ends 95 of the top straps 90 may be attached to the central bar 16 and the first ends 102 of the bottom straps 92 may be likewise attached to the central bar 16. In one embodiment, the top and bottom straps 90, 92 may be one piece or in an alternative embodiment, they may be separate pieces. As shown in FIG. 7, the top and bottom straps 90, 92 may be attached to the central bar 16 by a fastener, welding or the like at the first ends 95, 102 thereof. The top and bottom straps 90, 92 may further include ratchet mechanisms 120, 124 to help with tightening of the top and bottom straps 90, 92 during installation of the bike mount 10.

The side straps 94 may be attached to the brackets 20 at the first end 108 of the side straps 94. Like the top and bottom straps 90, 92, the side straps 94 may include a ratchet mechanism 126 to assist with tightening of the side strap 94 during installation of the bike mount 10 on the vehicle 11.

To install the bike mount 10 to a vehicle 11, the user loosens the counter slot knobs 62 and rotates the lower attachment bar 14 to the open portion shown in FIG. 1. The user then tightens the counter slot knobs 62. The user will rest the lower attachment bar 14 on the vehicle bumper, on vehicle license plate, a vertical position of trunk or hatch, or such other appropriate location on the vehicle 11. The user then loosens the rotating knobs 60 and rotates the upper attachment bar 12 until it contacts the vehicle 11. The mount rails 70 should be at a slight angle upwards. Then the user will tighten the rotating knobs 60.

To further secure the bike mount 10 to the vehicle 11, the user attaches the hook ends 100 of the top straps 90 straps to the top edge of the trunk or hatch. If a spoiler is present, the top straps 90 should be routed under the spoiler if possible. The user then attaches the hook ends 106 of the lower straps 92 to the bottom edge of trunk or hatch. The user should then be sure to center the bike mount 10 on the vehicle 11 and slowly tighten the top and lower straps 90, 92 evenly. Finally, the user will attach the hook ends 112 of the side straps 94 to a side edge of the trunk or hatch of the vehicle 11. The user then can tighten the straps 90, 92, and 94 using the applicable ratchet mechanisms 120, 124, and 126. To uninstall, the user just follows the reverse.

The embodiments of the invention have been described above and, obviously, modifications and alternations will occur to others upon reading and understanding this specification. The claims as follows are intended to include all modifications and alterations insofar as they come within the scope of the claims or the equivalent thereof.

Having thus described the invention, I claim:

1. A mount assembly securable to a vehicle, said mount assembly comprising:
   a first member adjustable in a plurality of fixed positions about a first axis;
   a second member secured with said first member and adjustable in a plurality of fixed positions about a second axis independent of said fixed positions of said first member, wherein said second member is pivotable with respect to said first member when secured with said first member; and
   at least one mount rail secured to said first and second members, said mount rail capable of carrying a bicycle, wherein said first axis is spaced from said second axis.

2. The mount assembly of claim 1 wherein said first member is vertically adjustable relative to said vehicle.

3. The mount assembly of claim 2 wherein said second member is vertically adjustable relative to said vehicle.

4. The mount assembly of claim 1 wherein said first member is a substantially u-shaped bar and said second member is a substantially u-shaped bar positioned below said first member.

5. The mount assembly of claim 1 further comprising a central bar wherein said first and second members are pivotally secured to said central bar and said at least one mount rails is secured to said central bar.

6. The mount assembly of claim 5 further comprising at least one bracket secured to said central bar, wherein said first and second members are pivotably secured to said bracket.

7. The mount assembly of claim 1 further comprising a plurality of mounting members positioned along and secured to said mount rail, said mounting members capable of carrying said bicycle.

8. The mount assembly of claim 6 wherein said at least one bracket includes a first slot and a second slot, wherein said first slot engages said first member and said second slot engages said second member.

9. The mount assembly of claim 8 wherein said first slot includes a plurality of notches wherein said notches fixes said first member in said plurality of fixed positions.

10. The mount assembly of claim 9 wherein said second slot includes a plurality of notches wherein said notches fixes said second member in said plurality of fixed positions.

11. The mount assembly of claim 10 further comprising a first rod attached to said first member and a second rod attached to said second member wherein said first rod engages said notches on said first slot to fix said first member in said plurality of fixed positions and wherein said second rod engages said notches on said second slot to fix said second member in said plurality of fixed positions.

12. The mount assembly of claim 11 further comprising rotating knobs secured to said first rod and said second rod, wherein loosening said rotating knobs permits adjustment of said first member and said second member relative to said vehicle.

13. A bicycle mount assembly securable to a vehicle having a rear portion, said mount assembly comprising:
   a cross bar;
   a first bar secured with said cross bar at a first portion of a bracket and securable to said rear portion of said vehicle, wherein said first bar is pivotable when secured with said cross bar;
   a second bar secured with said cross bar at a second portion of said bracket and securable to said rear portion of said vehicle, wherein said second bar is pivotable when secured with said cross bar and said first portion is spaced from said second portion; and
   at least one mount rail attached to said cross bar and extending away from said first and second members, said mount rail capable of carrying a bicycle.

14. The bicycle mount assembly of claim 13 wherein said first second bars are selectively securable to said rear of said vehicle in a plurality of fixed positions.

15. The bicycle mount assembly of claim 14 wherein said first bar pivots independently of said second bar.

16. The bicycle mount assembly of claim 13 wherein said first and second bars are securable to said rear of said vehicle in a plurality of vertically fixed positions, said vertically fixed positions of said first bar are independent of said vertically fixed positions of said second bar.

17. A bicycle mount assembly selectively positionable and attachable to a vehicle, the mount assembly comprising:
   a cross bar;
   at least one bracket secured to said cross bar, said at least one bracket includes a first slot having a first plurality of notches and a second slot having a second plurality of notches;
   a first bar pivotably secured to said at least one bracket at a first portion and engageable with said first slot, wherein said first plurality of notches includes a pair of end notches and at least one intermediate notch whereby said pair of end notches and said intermediate notch secures said first bar at a plurality of fixed locations;
   a second bar pivotably secured to said at least one bracket at a second portion and engageable with said second slot, wherein said second plurality of notches secures said second bar at a plurality of locations and said first portion is spaced from said second portion.

18. The bicycle mount assembly of claim 17 wherein said at least one bracket comprises a first bracket and a second bracket.

19. The bicycle mount assembly of claim 18 further comprising at least one mount rail attached to said cross bar, said mount rail capable of carrying a bicycle.

20. The bicycle mount assembly of claim 19 further comprising a first rod attached to said first bar and a second rod attached to said second bar wherein said first rod engages said notches on said first slot to fix said first bar in said plurality of fixed positions and wherein said second rod engages said notches on said second slot to fix said second bar in said plurality of fixed positions.

21. The bicycle mount assembly of claim 20 further comprising rotating knobs secured to said first rod and said second rod, wherein loosening said rotating knobs permits adjustment of said first and second bars relative to said vehicle.

22. The bicycle mount assembly of claim 17 wherein said second plurality of notches includes a pair of notches on opposing ends of said second slot.

23. The bicycle mount assembly of claim 22 wherein said second bar is securable at any location between said pair of notches.

24. The bicycle mount assembly of claim 17 further comprising a pair of mount rails fixedly attached to said cross bar, said pair of mount rails capable of carrying a bicycle.

25. The bicycle mount assembly of claim 17 further comprising a strap attached with said cross member.

26. The bicycle mount assembly of claim 25, wherein the strap is attached with said cross member in a fixed position.

* * * * *